United States Patent [19]

Blakely

[11] 4,105,587

[45] Aug. 8, 1978

[54] PROCESS FOR PRODUCING A PARTICLE PACK COMPOSITION COMPRISING ALUMINA AND THE RESULTING ATTRITION RESISTANT COMPOSITION

[75] Inventor: Donald W. Blakely, Oakland, Calif.

[73] Assignee: Chevron Research Company, San Francisco, Calif.

[21] Appl. No.: 852,016

[22] Filed: Nov. 16, 1977

[51] Int. Cl.² ................... B01J 21/04; B01J 23/84; B01J 27/04; B01J 27/10
[52] U.S. Cl. ................... 252/439; 252/442; 252/463; 252/464; 252/465; 252/466 J; 252/466 PT; 252/477 R; 208/136; 208/216; 208/251 H; 208/254 H
[58] Field of Search ............... 252/439, 442, 463, 464, 252/465, 466 J, 466 PT, 477 R

[56] References Cited

U.S. PATENT DOCUMENTS

| | | | |
|---|---|---|---|
| 3,162,607 | 12/1964 | Burbidge et al. | 252/477 R |
| 3,377,269 | 4/1968 | Bloch | 252/465 X |
| 3,630,888 | 12/1971 | Alpert et al. | 252/465 X |
| 3,709,832 | 1/1973 | Ao | 252/429 R |
| 3,770,617 | 11/1973 | Riley et al. | 208/216 |
| 3,873,470 | 3/1975 | Conway et al. | 252/465 |
| 3,898,155 | 8/1975 | Wilson | 208/251 H |

*Primary Examiner*—W. J. Shine
*Attorney, Agent, or Firm*—D. A. Newell; R. H. Davies; D. L. Hagmann

[57] ABSTRACT

A particle pack composition comprising alumina having improved attrition resistance is produced by dry steaming a dough-like mixture of water, a hydrocolloid-forming compound and particles comprising alumina prior to calcining the mixture.

11 Claims, No Drawings

PROCESS FOR PRODUCING A PARTICLE PACK COMPOSITION COMPRISING ALUMINA AND THE RESULTING ATTRITION RESISTANT COMPOSITION

BACKGROUND OF THE INVENTION

This invention relates to an improved process for producing a composition comprising alumina having an improved atrition resistance, and to the resulting composition. More particularly, it relates to an improved process for producing a rigidly interconnected pack of particles comprising alumina having improved attrition resistance, to the resulting composition, to a hydrocarbon conversion catalyst containing said particle pack and to a process employing said catalyst.

PRIOR ART

Compositions comprising alumina are known and used, for example, as adsorbents, contact material for reaction mixtures, catalyst and catalyst carriers or supports. These compositions in the form of packs of rigidly interconnected particles containing access channels are known to be especially desirable, because there is effective access and egress of a feed, for example, high-molecular-weight hydrocarbons and the like, into and from the composition. A convenient and advantageous process for preparing such a composition is disclosed in U.S. Patent Application Ser. No. 708,804, filed July 26, 1976, Bernard F. Mulaskey, inventor. However, there is a need for improvement in the attrition resistance of this composition.

It is an object of this invention to provide an improved process for producing a particle pack composition comprising alumina having an improved attrition resistance. Other objects and advantages will be evident from the description of the invention.

SUMMARY OF THE INVENTION

An improvement is provided in a process for producing a rigidly interconnected pack of pulverable particles having average diameters in the range below about 1.3 mm, and comprising aluminum oxide by steps including (1) drying a dough-like mixture comprising said particles, water and an organic hydrocolloid-forming compound; and (2) calcining said dried mixture, the improvement comprising, prior to said calcining, dry steaming said dough-like mixture and/or said dried mixture at a temperature in the range of from about 100° C to 175° C for a period in the range of from about 0.3 to 24 hours, wherein the resulting rigidly interconnected particle pack, relative to a comparable particle pack produced without said steaming, exhibits a substantially improved attrition resistance.

Another aspect of the invention is (1) a process for producing a catalyst comprising a carrier component and a catalytic component containing at least one hydrogenating agent by (a) wetting said carrier component with a solution of said agent or of a precursor thereof, and (b) drying the resulting wet carrier, said hydrogenating agent being selected from the group consisting of the metals, oxides, sulfides and chlorides of the metals of Groups V, VI, VII and VIII of the Periodic Chart of the Elements, the improvement wherein said carrier component is a pack of particles produced as in the process described above, (2) producing a hydrocarbon conversion catalyst, especially wherein the particles contain at least 1 weight percent of aluminum oxide, more preferably contain at least 25 weight percent, and most preferably consist essentially of said oxide, and (3) the resulting catalyst composition.

Another aspect of the invention in producing the particle pack composition herein is the use of particles obtained by pulverizing an ordinary unused or used hydrocarbon conversion catalyst.

A further aspect of the invention in preparing the particle pack compositions herein is the use of at least two different kinds of particles selected from the group consisting of particles comprising (1) aluminum oxide, (2) aluminum oxide and at least one of the oxides of the metals of Groups II, IV and of the other metals of Group III, and (3) particles of (1) or (2) containing at least one hydrogenating component selected from the metals, oxides, sulfides and chlorides of the metallic elements of Groups V, VI, VII and VIII, and the resulting composition.

EMBODIMENT OF THE INVENTION

In a preferred embodiment of the invention, a rigidly interconnected pack of particles is prepared by blending (1) calcined alumina powder (means diameter 7 microns); (2) based upon the alumina, 2 weight percent of a hydrocolloid-forming gum, for example, Kel gum; and (3) sufficient water to form a dough-like mixture. The dough is then shaped and sized by extruding it through a round orifice having a diameter of about 1.6 mm and by cutting the extrudate into roughly the same sized length. These lengths are then steamed using dry steam for 16 hours at a pressure of about 2 atmospheres and a temperature of about 120° C. The steamed extrudate is then dried by placing it in a muffle furnace and, while passing a stream of air over it, slowly raising the temperature in the furnace to about 204° C. After maintaining the 204° C temperature for about 1 hour, the furnace and its charge are then heated to about 510° C and maintained at about this temperature for about 3 hours. The resulting particle pack composition, relative to a pack produced without steaming, is substantially improved. This is shown by the following comparative data. These data were obtained by dividing an extrudate into two portions and, but for the steaming step in one instance, drying and calcining the two portions under comparable conditions. In an attrition test described below, the following comparative data were obtained:

|  | Steamed | Unsteamed |
|---|---|---|
| Attrition, wt. % | 1.2 | 6.3 |
| Crush strength, lbs. per mm | 9.0 | 7.9 |
| Surface area, (N$_2$, m$^2$/g) | 324 | 177 |

These data demonstrate at least a 5-fold improvement in attrition resistance for the product produced by the process of the invention over that produced in the conventional manner.

Other demonstrated advantages for the present process include the production of a product having an improved crush strength (14% improvement) and an increased surface area (83% improvement).

Whether desired for use in a fixed bed, fluid bed or slurry operation, a particle pack composition must exhibit at least an acceptable resistance to attrition. The optimum, of course, is no attrition at all, but such is seldom achieved. Acceptable attrition varies depending upon a number of factors, including (1) cost considerations; and (2) the relative ease of separating attrited solid from the desired product. As a general rule, about a 3 weight percent attrition (determined by the standard test described below) is usually an acceptable maximum attrition, especially where the particle pack is a carrier or support component for a catalyst composite containing a noble metal catalyst agent.

An advantage of the particle pack composition herein is that it contains no binding material residuum. The pores and surface of the particle pack composition are, therefore, free of materials which may be, and usually are, alien to a desired contact material. In order to produce a rigidly interconnected particle pack composition in a preferred manner herein, it is necessary in the process to prepare a dough-like mixture using appropriate amounts of (1) a pulverable particulate solid comprising alumina, (2) a hydrocolloid-forming organic compound and (3) water. The preparation of a satisfactory carrier or support, contact mass or catalyst is depending upon the amounts of hydrocolloid-forming organic compound and water relative to the pulverized solid which may be present in the dough-like intermediate. If too much of the hydrocolloid-forming organic compound is used, the resulting product, after drying and calcining, is a powder rather than a rigidly interconnected pack of particles. If too much water and a satisfactory amount of hydrocolloid-forming compound are used, the resulting composition has poor attrition resistance and crush strength and an undersirably large volume fraction of macropores.

The relative amount of water and hydrocolloid-forming organic compound required for use in the preparation of the dough-like intermediate varies depending upon several factors, including the specific pulverized solid used, and its pore volume, upon the specific hydrocolloid-forming organic compound used and upon the amount of water used. In general, a satisfactory amount of water is sufficient for complete imbibation of water by the solid plus sufficient to produce a plastic dough, for example, suitable for extruding or forming a thick film thereof. This is usually an amount of water, in parts by volume per 100 parts of the solid component, in the range 30 to 200 parts, preferably for porous particles, an amount in the range 80 to 200 parts, and more preferably 80 to 125 parts. In general, a satisfactory amount of the organic compound(s), based in parts by weight upon 100 parts water, is in the range 0.2 to 30 parts, preferably 1 to 15 parts, and more preferably 2 to 10 parts.

The order of the mixing of the components of the dough-like intermediate is not critical. Usually, it is more convenient to premix the solid(s) and then add the water. It is also convenient to add sufficient water for imbibation of water by the pulverized solid, then admix the organic hydrocolloid-forming compound, and finally the balance of the water required to form an extrudable or satisfactory mix. Alternatively, a mixture of water plus the hydrocolloid-forming compound may be added to the water-imbibed solid or dry solid.

The dough-like composite may be shaped by any suitable method, for example by (1) extruding, cutting, if desired, and drying; (2) drying, pulverizing and screening; (3) or the like. The extrusion method is preferred. The particle packs, clusters, etc., produced herein may be sized to any suitable combination of dimensions normally desired for a carrier, contact mass or catalyst employed in hydrocarbon hydroprocessing for fixed, fluid bed or slurry-type operation. An especial advantage of the composition of the invention is that it may be sized in packs as large as 7 mm and larger in diameter and used without the serious pressure drop and diffusion limitation problems normally encountered by the use of the 0.076 mm sized catalyst particles suggested, for example, for use for heavy hydrocarbon feedstocks (see U.S. Pat. No. 3,562,800).

The particles used in the preparation must comprise alumina and may be obtained by any suitable method, for example by pulverizing a used or unused catalyst or a catalyst carrier containing the requisite refractory (i.e., a material that is slow to soften and resists heat) oxide. These particles must be sufficiently stable formwise that they suffer little or no deformation during the dough forming and shaping steps of the preparative process. In general, this requirement is satisfied where the particles are pulverable, have been calcined, or prepared from calcined materials. The particles should have average diameters in the range below 1.3 mm. Desirably a substantial fraction of the particles in a mixture thereof used to prepare the dough-like intermediate herein have average diameters in the range from about 0.1 to 15 microns. This fraction, in terms of the bulk volume contribution to a dry mixture of the particles, may vary widely and for preparation of a satisfactory pack of particles is usually in the range 10 to 90, more often 15 to 75 percent, of the total bulk volume of the mixture of particles.

The particles used in the process herein must contain at least an appreciable (1 weight percent of aluminum oxide, calculated as $Al_2O_3$) amount of aluminum oxide. Preferably, these particles contain at least 10 weight percent of aluminum oxide, more preferably at least 50 weight percent, and most preferably, for example, for use as a support or carrier component of a catalyst composite containing a carrier component and a catalytic metal component for hydrogenating a hydrocarbon feedstock, consist essentially of alumina. In the absence of the required aluminum oxide, there results no satisfactory binding of the particles into a rigid pack. The remainder, if any, of the particles may be at least one refractory oxide component selected from the group consisting of the oxides of the other metals of Groups II, III and IV and/or at least one of the metals, sulfides, oxides and chlorides of the metallic elements of Groups V, VI, VII and VIII of the Periodic Chart of the Elements. Preferably, the particles are calcined (480°–925° C) oxides and mixtures thereof as defined above.

The particles used in the process herein may be porous or non-porous. Preferably, they are porous, having a pore volume in the pore volume range of from about 0.3 to 0.9 cc/g and larger, of which at least the major portion thereof is contributed by pores having average diameters in the range below 1000 Angstroms, preferably below 200 Angstroms, the remainder, if any, being, in the main, sized in the average diameter range below about 15 microns and above said enumerated sizes, wherein said pore volume and pore size distribution is a composite in which the mercury porosimetry method is used for determining pore volume and pore size distributions for pores sized in the average diameter range above 40 Angstroms and the well-known nitrogen adsorption (BET) method is used for determining pores sized in the range below 40 Angstroms and the pore volume contribution thereof to the total pore volume.

In addition to the required aluminum oxide component, representative refractory oxide remainders for the particles herein, if any, include magnesia, calcium oxide, titania, zirconia, silica, zinc oxide, barium oxide, kieselguhr, bauxite, diatomaceous earth and the like, and natural and synthetic crystalline aluminosilicates (zeolites) and mixtures thereof. Preferred included zeolites are those of the faujasite-, eronite-, mordenite- and ZSM-type. When the particles contain a zeolitic component or comprise a zeolite (the process herein is useful for producing a particle pack composition comprising one or more zeolites), they may be substantially free of hydrogenating metal components (unloaded zeolites) or they may contain a substantial content of hydrogenating metal components (loaded zeolites).

A wide variety of hydrogenation components is satisfactory for inclusion in the particle pack composition herein. These, in general, are the oxides, sulfides and metals of the metallic elements of Groups VIB and VIII of the Periodic Chart of the Elements and of vanadium. One or more of these may be present. Representative components include vanadium, molybdenum, tungsten, cobalt, nickel and palladium and the like in one or more of the several forms listed above. The combinations of cobalt and molybdenum or tungsten, or of nickel and molybdenum or tungsten, are preferred. An effective amount of the hydrogenation component is, in general, in the range 0.1 to 50 weight percent, based upon the oxide carrier and calculated as metal. In addition, a minor amount of a promoter or stabilizer such as phosphorus, rhenium or the like, for example as the oxide, sulfide or chloride, may be present in the catalyst in an effective amount, for example, an amount in the range 0.1 to 10 weight percent based upon the oxide carrier and calculated as the element.

The particular hydrogenation component desirably present in the catalyst of the present invention will depend upon the particular hydrocarbon conversion or hydrotreating desired. For example, for demetalation service, cobalt and molybdenum or tungsten are especially suitable, as are also nickel and molybdenum or tungsten. For hydrocarbon saturation and/or reforming service, depending upon the process conditions employed, a Group VIII noble metal hydrogenating component is especially suitable. Similarly, conventional process conditions and hydrogenation components especially suitable for hydrodesulfurizing, hydrocracking and the like, hydroconversion processes may be used.

The sizing of the particles in the rigid pack, cluster or bunch of the composition herein may vary over a range and is dependent, in general, upon the desired size and content of interparticle macropores desired for the reduction and/or elimination of reactant diffusion problems. In general, a satisfactory catalyst is produced by the method herein when the particles have average diameters in the range below about 1.5 mm, especially wherein (1) less than 5 weight percent thereof have average diameters in the range 0.15 to 1.3 mm, (2) at least 10 weight percent thereof have average diameters in the range above about 0.1 micron and (3) the remainder thereof have average diameters in the range below 0.15 mm. Preferably, the particles sizing is diverse and of a wide range of average diameters. An especial advantage of the catalyst and preparation herein is that no special screening or selection of particularly sized fractions is necessary for the preparation of a satisfactory catalyst. By average diameter as used herein is meant by definition the geometrical average diameter normally obtained for an irregularly shaped particle.

The size (average diameter) of the catalyst pack herein may vary widely, depending upon the contemplated use, for example, as in fixed bed, fluid bed, or slurry system usage. Broadly, the more useful packs will be sized in the diameter range from about 0.5 mm to 15 mm, preferably 3 to 10 mm.

An especial advantage of the catalyst of the invention is that the rigid pack, cluster or bunch of particles may be sized as large as 10-13 mm in average diameter and larger without serious diffusion limitation effects which force refiners using conventional catalysts to use catalysts sized in the 0.79 (1/32 inch) mm to 1.58 (1/16inch) mm diameter range, the usual serious problem re high back pressures and the like, notwithstanding.

A further and special advantage of the catalyst of the invention is that a mixture of two or more different kinds of particles having different catalytic activities may be used in the preparation of the catalyst pack or cluster herein, thereby yielding a catalyst having bi- or polymodal activity. For example, particles obtained by pulverizing a hydrodesulfurizing catalyst (as in U.S. Pat. No. 3,770,617) may be mixed with particles obtained by pulverizing a hydrocracking catalyst (as in U.S. Pat. No. 3,242,100) to produce a mixture of particles which is thereafter used in the catalyst preparation method herein. The resulting catalyst is bifunctional, and its use in processing sulfur-contaminated hydrocracking feedstocks is advantageous. It has also been found advantageous to include unloaded (i.e., substantially free of catalytic metal components) refractory oxide particles with pulverized particles of a hydrodesulfurizing catalyst (loaded particles) in a mixture used in the preparation of the catalyst herein. Other examples include the use of mixtures of two or more different kinds of particles, for example, in which (1) a portion is especially effective for hydrodenitrifying and a portion is especially effective for hydrodemetalizing a hydrocarbon feedstock, (2) a portion has particular hydrodesulfurizing activity and a portion has particular isomerizating activity for a sulfur-contaminated hydrocarbon feedstock, (3) a portion is effective for hydrodenitrifying and a portion is effective for hydrohydrodesulfurizing a contaminant hydrodenitrifying and a portion is effective for hydrodesulfurizing a contaminant hydrocarbon feedstock, (4) a portion is effective for hydrogenating and a portion is effective for hydrocracking a hydrocarbon feedstock, or (5) and the like mixtures of particles having different catalytic activities either with or without an additional portion of unloaded refractory oxide particles. The use of mixtures of two, three or more different kinds of catalytic (loaded) particles is contemplated herein either with or without one or more kinds of unloaded refractory oxide particles for the preparation of the pack, cluster or the like catalyst composition herein. Additionally, a portion of particles having desirable and selective absorptive properties for undesirable feed and/or product components, such as thiols, nitrogen-containing compounds, and the like may also be included in the particle mixtures herein.

CATALYST PREPARATION

In the process herein for preparing the particle pack compositions of the invention, it is necessary to prepare a dough-like composition using (1) a suitable particulate solid, (2) a suitable cohesive component and (3) water, these components being admixed in a required range of relative amounts. In addition to the foregoing requirements, and before the calcining in the preparative process (see description below), a steaming step is necessary in order to produce a particle pack composition having a materially improved resistance to attrition.

Steps essential to the process for the production of a particle pack composition include (1) steaming a suitable dough-like mixture; and (2) calcining the steamed mixture. Desirably, included in the process are (i) a shaping step and (ii) a drying step, either of which may be preceded and/or followed by the steaming step. In the preferred embodiment of the process herein, the process steps, and order thereof, are as follows: (1) preparing a suitable dough-like mixture; (2) shaping the dough-like mixture; (3) steaming the shaped mixture; (4) drying the steamed mixture; and (5) calcining the dried mixture. The particles used in preparing the dough-like mixture may or may not contain disposed thereon an ordinary catalyst component or precursor thereof. In the former case, the calcined particle pack composition is suitable for use as a catalyst or catalyst precursor in a hydrocarbon conversion process. In the latter case, the resulting particle pack composition, if prepared using particles having hydrocarbon cracking activity, for example, acidic silica-alumina particles and/or a crystalline alumino-silicate, is of itself useful as a cracking catalyst; or the resulting particle pack composition may be used as a carrier or support component for a hydrocarbon conversion catalyst, which, but for the particle pack configuration, is a conventional catalyst prepared by disposing a suitable catalytic component thereon, activating, if desired, and using the resulting catalyst, by means which are conventional.

STEAMING

Suitable conditions for the steaming step include the following:

|  | Broadly | Preferred |
| --- | --- | --- |
| Temperature range, ° C | 100–200 | 105–130 |
| Pressure, Atm. | 1–15 | 1–5 |
| Time, Hours | 0.1–24 | 0.3–3 |

Preferably, the steaming is carried out using unsaturated (e.g., dry) steam.

ATTRITION TEST

For this test, a horizontal cylinder is used having a diameter of about 12 inches and fitted with two internal paddles. A charge of 30 grams of the particle pack composition is introduced into the cylinder which is then rotated for 30 minutes at 10 revolutions per minute. The resulting material is removed from the cylinder, screened using a 16 mesh screen, and that which passes through the screen represents the attrition experienced from the test.

Representative solids suitable for use in preparing the particles required herein, for example by pulverizing and, if desired, screening the solid, include conventionally prepared porous hydroconversion catalysts and suitable porous carriers therefore having the requisite content of aluminum oxide, or aluminum oxide plus hydrogenating component and remainder, if any. These catalysts or carriers may be newly prepared, partially used, used and regenerated in full or part by conventional means or the like.

Represenative prior art catalysts suitable as a source of pulverized solid for use in obtaining suitable particles herein, include:

|  | Conversion or Hydroconversion | Catalyst Type | Reference |
| --- | --- | --- | --- |
| (1) | Isomerizing | $Al_2O_3$—Zeolite | U.S. 3,723,552 |
| (2) | Hydrocracking | Group VIII & Amorphous Alumino silicate | U.S. 3,769,235 |
| (3) | Cracking | Silica—Alumina | U.S. 2,870,082 |
| (4) | Hydrodenitrifying | Ni—Mo—$Al_2O_3$ | U.S. 3,114,701 |
| (5) | Hydrocracking | Sulfided Ni—Co—Support | U.S. 3,166,491 |
| (6) | Hydrotreating | Reactivated Hydrodenitrifying | U.S. U.S. 3,172,864 |
| (7) | Hydrocracking | Cogelled Silica—Alumina | U.S. 3,242,100 |
| (8) | Hydrocracking | Zerogel Plus Group VIII | U.S. 3,243,368 |
| (9) | Hydrocracking | Fluorided Hydrocracking | U.S. 3,325,396 |
| (10) | Hydrocracking | Modified $SiO_2$—$Al_2O_3$ Cracking | U.S. 3,328,291 |
| (11) | Hydrocracking | Ni—W Promoted $SiO_2$—MgO Base | U.S. 3,333,216 |
| (12) | Hydrotreating | Metal Phosphate Modified | U.S. 3,493,517 |
| (13) | Hydroconversion | Zeolite—Matrix—Group VIII | U.S. 3,535,225 |
| (14) | Hydrodesulfurizing | Group VI & VIII—$Al_2O_3$ | U.S. 3,770,617 VIII |
| (15) | Hydroprocessing | Silica Modified $Al_2O_3$—Groups VI & VIII | U.S. 3,692,698 |
| (16) | Hydroforming | Pt on $Al_2O_3$ | U.S. 2,973,330 |
| (17) | Reforming | Pt—Re—$Al_2O_3$ | U.S. 3,415,737 | and the like conventional prior art catalysts.

In the preparation of the dough-like material which is an intermediate in the catalyst preparation method herein, and in addition to the particles and water employed, an organic cohesive component is required. On the basis of empirical results and when used in particular relative amounts, excellent adhesion results between the particles of the pack by the adhesive component although at the completion of the calcining step there is apparently no appreciable residue or remainder thereof in the composition. The resulting composition is a rigidly interconnected pack of particles. In stark and surprising contrast, when too much or too little of the adhesive component is used to prepare the dough-like mixture, the resulting composition is wholly unsatisfactory; for example, when too much is used, a powdery mass of particles is recovered.

Organic compounds suitable for use herein are, in general, hydrocolloid-forming compounds and such compounds are contemplated for use. These are natural or synthetic compounds comprising carbon, hydrogen and oxygen, and may also contain, relative to carbon, a minor amount of one or more other elements such as nitrogen, halogen and the like, and (1) swell and form a colloid when contacted with water, (2) have a molecular weight in the range above about 1000 and (3) exhibit ordinary inter- and intra-molecular hydrogen bonding and viscosity enhancing effects in aqeous media.

Representative hydrocolloid-forming compounds include wheat flour, corn starch, guar gum and ordinary derivatives thereof, polysaccharide gums, such as Xanthan gum, and the like, locust bean gum, methyl vinyl ether/maleic anhydride copolymers, acrylic resins and the like hydrocolloid-forming compounds. Corn starch and wheat flour are preferred because of their relatively low cost and effective adhesive promoting action. On the other hand, the use of hydrocolloid-forming materials such as guar, Xanthan and locust bean gums is advantageous, despite their relatively high cost because they are effective cohesive agents at very low use levels, for example in the range 0.1 to 1 weight percent, based upon the amount of water used.

When present in the precursor mixture in the required amount, the hydrocolloid-forming organic compound promotes cohesion of the pulverized solid. It also, is some degree, aids in the extruding or shaping of the dough-like intermediate.

PROCESS CONDITIONS

The conditions suitable for use of the particle pack catalyst compositions of the invention vary widely depending upon a number of variables, including (1) the feed, (2) the hydrotreatment or processing desired and (3) the conversion desired. In general satisfactory conditions include contacting the catalyst with the feed in the liquid and/or the gaseous state and with or without hydrogen as follows:

| | |
|---|---|
| Temperature, °C | 200–540 |
| Total pressure, atm. | 1–300 |
| Hydrogen partial pressure, atm. | 0–200 |
| Hydrogen rate, SCL/L | 0–9000 |
| Liquid Hourly Space Velocity, V/V/Hr. | 0.1–25 |

FEEDSTOCK

The particle pack composition of the invention containing a hydrogenation component is useful for the treating of any suitable hydrocarbon feedstock. It is especially useful for the hydrotreating or hydroprocessing of feedstocks containing at least an appreciable amount of high-molecular weight components, for example at least 5 weight percent, preferably at least 10 precent. Diffusion limitation problems, in general, become increasingly troublesome with increasing molecular weight of the feedstock. Other factors involved include molecular configuration and the like. By the term "high molecular weight" as used herein is meant molecular weight corresponding to hydrocarbons having a normal boiling point of at least 315° C.

Representative feedstocks contemplated for use herein include whole crude oils, fractions of crude oils such as atmospheric gas oils and residua or vacuum gas oils and residua, processed fractions thereof, especially those oils having initial boiling points above 315° C or which contain at least a 5 weight percent component boiling above 315° C and the like. Other representative feedstocks include coal-derived oils, shale oils and the like oils. Yet other representative feedstocks include slurries of liquefiable or partially liquefiable finely divided solids in oil, such as creosote oil, and oils containing suspended solids. Feedstocks which contain an appreciable content (at least 10 ppm, weight) of metals contaminants normally present in crude oil are especially advantageously treated in a hydrotreating process employing the catalyst herein. Metal contaminated petroleum derived feedstocks are preferred for use herein.

EXAMPLES

The examples described below are presented for further illustration, but not the limitation of the claimed invention.

EXAMPLE 1

A comparative test is made as between a conventional hydrocarbon demetalation catalyst and a catalyst of the invention. The active components, hydrogenation agents and micropore distribution for the catalyst is essentially identical. Thus, an aliquot of a prior art catalyst is pulverized and used to prepare a catalyst in the preferred manner described herein. The hydrogenation component is cobalt (3 weight percent) and molybdenum (10 weight percent) oxides, sulfides and/or metal conventionally present in a hydrocarbon demetalation catalyst supported on alumina (76 weight percent). The essential difference between the catalysts is believed to be the relative macropore (pores having diameters in the 0.1 to 15 micron range) contents as follows:

| | Prior Art (A) | Present (B) |
|---|---|---|
| Total pore volume, cc/ml | 0.6 | 0.7 |
| Pore volume in macropores, cc/ml | ~0 | 0.2 |
| Pore volume in pores of a diameter 80–150 Angstroms, % | >97 | 70 |

For the tests, an aliquot of each catalyst sized in the 8/14 mesh range is charged as a fixed bed to a microreactor suitably fitted for operational control of the other process variables. The feed used in a heavy Arabian atm. residua having the following characteristics:

| | |
|---|---|
| Metals Content | |
| Vanadium, ppm | 22 |
| Sulfur content, wt. % | 4 |
| Asphaltenes (Hot Heptane Insoluble), wt. % | 6 |
| 538° C + fraction, wt. % | 46 |

The conditions employed for the hydroconversion are:

| | |
|---|---|
| Temperature, °C | 382–399 |
| Pressure, atm. | 124 |
| H$_2$ rate, StdL/ml of feed | 1.8 |

First order reaction rates estimated for a temperature of 399° C: (1) on the volumetric basis and per unit weight of the active catalyst; (2) using the liquid hourly space velocity (LHSV) of the 538° C fraction of the feed; and (3) using identically sized catalysts of 8/14 mesh are about as follows:

| | Estimated Volumetric Reaction Constant K | |
|---|---|---|
| | Catalyst | |
| Hydroconversion Reaction | A | B |
| Vanadium removal | 0.3 | 0.6 |
| Nickel removal | 0.3 | 0.4 |
| Sulfur removal (desulfurization) | 0.6 | 0.4 |
| Asphaltene removal (hydrogenation) | 0.2 | 0.7 |
| 538° C + removal (hydrocracking) | 0.1 | 0.07 |

The catalyst herein is remarkably effective for the removal of metal contaminants from a heavy hydrocarbon feedstock. At the same time it exhibits other substantial hydrocarbon hydroconversion activities, such as for hydrodesulfurization, hydrogenation, hydrocracking and the like. By varying the process conditions, for example, the temperature, pressure and the like, these activities may be enhanced or reduced as desired. Thus, in general, the instant catalyst is useful as a catalyst for heavy hydrocarbons (i.e. hydrocarbons boiling at a temperature above 315° C and containing ordinary organo-metallic impurities) hydroconversion (hydroprocessing) reactions carried out under conditions, including:

(1) a temperature in the range from about 200° to 540° C;

(2) a system pressure in the range from about 1 to 300 atmospheres;

(3) a hydrogen partial pressure in the range from about 0 to 200 atmospheres; and (4) a liquid hourly space velocity in the range from about 0.1 to 25 V/V/Hr.

These data also demonstrate that a catalyst herein, having a substantial macropore content, exhibits a remarkable hydrogenation activity for asphaltenes (hot heptane insoluble hydrocarbons) and the like. In conventional practice, where a feed has a high asphaltene content, a deasphalting step is frequently employed before a hydrogenation treatment, which step normally reduces the liquid yield of hydrocarbons from the feed, because of catalyst fouling, short life and the like problems. The present catalyst permits a hydrogenative treatment of a high-asphaltene content feed without a prior deasphalting step. Subsequently, if desired, a deasphalting step may be used to remove residual asphalt and associated metals with a resulting relatively higher liquid yield than when deasphalting is first applied without a prior hydrogenative treatment.

EXAMPLE 2

Catalyst B above is tested for its metal loading capacity using a Gach Saran heavy hydrocarbon residua (sulfur content, 2.6 weight percent; nitrogen content, 0.4 weight percent; Ni, 37 ppmw; V, 119 ppmw; Fe, 4 ppmw; Ramsbottom carbon, 7.3 weight percent; asphaltenes, 6 weight percent) under the following conditions:

| | |
|---|---|
| Temperature, ° C | 382–432 |
| Pressure, atms. | 178 |
| H$_2$ rate, SL/ml of feed | 1.78 |
| LHSV | 2.2 |

This catalyst demonstrates a metals-loading capacity of about 0.1 g/cc of catalyst after about 415 hours on stream. The prior art catalyst A, in the same test at the end of run (425 hours) exhibits a metals-loading capacity of about 0.06 g/cc of catalyst. At the end-of-run catalyst B after 1048 hours exhibits a final capacity of about 0.2 g/cc. Catalyst B exhibits a metals capacity superiority over catalyst A by a factor of about 3.

Catalyst B is effective for vanadium removal. (See article entitled "Intraparticle Diffusion Effects In Residue Hydrodesulfurization" by Shah & Parokos, I & E.C., Vol. 14, No. 4, 1975, re effectiveness factor). The effectiveness is found to be about 0.5 at the reactor inlet. Catalyst A exhibits an effectiveness factor of about 0.2 for vanadium removal at the reactor inlet.

EXAMPLE 3

A catalyst, C, is prepared and tested as in Example 1 except that the hydrogenation component comprises nickel and molybdenum in a coprecipitated cogel of silica-alumina containing titania and phosphorus. It has a pore volume of about 0.6 cc/cc of which 40% is in pores having a diameter in the 0.1 to 15 micron range. Less than about 0.06 cc/cc of the pore volume is in pores having a diameter of less than 40 Angstroms. The results obtained for the first order reaction rate constants per unit volume of active catalyst for 399° C are about as follows:

| CATALYST C | |
|---|---|
| Hydroconversion Reaction | Estimated Volumetric Reaction Constant, K |
| Demetalation | |
| Vanadium removal | 0.6 |
| Nickel removal | 0.2 |
| Desulfurization | 0.4 |
| Hydrogen | |
| Asphaltene removal | 0.5 |
| Hydrocracking | |
| 538° C + removal | 0.1 |

EXAMPLE 4

A catalyst is prepared using the same materials as are used for the preparation of catalyst C in Example 3 above by steps including extruding and calcining to yield a 1.78 mm diameter catalyst having a macropore content which is 35 percent of the pore volume. It is then tested using the same feed and conditions as used in Example 2 except that in this example the conditions are adjusted to produce a product containing 0.5 weight percent sulfur as in the case for catalyst A in Example 1. Catalyst D is designed to preferentially remove metals, whereas catalyst A of Example 1 is a prior art catalyst which is designed to preferentially remove sulfur. The comparative metals level for the products are about as follows:

| | V, ppm | Ni, ppm | Estimated Reactor, Vanadium Loading 425 Hrs., cc/cc |
|---|---|---|---|
| Catalyst A | 40 | 14 | 0.06 |
| Catalyst D | 10 | 6 | 0.10 |

These data demonstrate that the inclusion of a substantial fraction of macropores in the pore volume of a catalyst markedly upgrades the performance for sulfur removal by a metals-removing catalyst.

EXAMPLE 5

Pulverized solid from a prior art catalyst as in Example 1 is used in a preparation by the method herein. The cohesive agent is guar gum (commercial designation A-40-F) powder of which 20 grams thereof are admixed into 980 grams of the pulverized catalyst followed by 750 grams of water. The resulting mixture is maintained at about 100° C for about 15 minutes during which time thorough mixing is effected. The catalyst is completed by extruding, drying, steaming and calcining to constant weight by heating at about 454° C. The resulting catalyst has about the following characteritics:

| | |
|---|---|
| Total Pore Volume, cc/cc | 0.7 |
| Micropore Pore Volume, cc/cc | 0.5 |
| Macropore Pore Volume, cc/cc | 0.2 |
| Crush Strength | Excellent |

EXAMPLE 6

Pulverized solid, 90 grams, from a prior art catalyst as in Example 1 are admixed with 10 grams of iron oxide powder, 10 grams of wheat flour and 55 grams of water.

The resulting mixture, after extruding, drying and calcining, has about the following characteristics:

| | |
|---|---|
| Total Pore Volume, cc/cc | 0.6 |
| Micropore Pore Volume, cc/cc | 0.4 |
| Macropore Pore Volume, cc/cc | 0.2 |
| Mean Diameter of Macropores, microns | 0.5 |

EXAMPLE 7

In a manner analogous to Example 6, a series of catalysts is prepared using the prior art catalyst of Example 1 except that in place of the iron oxide diluent or modifier, the following, in powdered form, is used: (1) a crystalline aluminosilicate (molecular sieve), (2) calcined alumina, (3) amorphous silica or (4) processed diatomaceous earth (Celite). In each case the resulting catalyst contains a satisfactory amount of access (macro) pores. The micropores thereof in the main corresponded to those for the prior art catalyst plus a contribution from the modifier which varies from little or none to an appreciable contribution depending upon the modifier. For example, in the case where the zeolite sieve is added, the micropore fraction of the pore volume contains a material amount of pores in the 6 to 10 Angstrom diameter range. The resulting catalyst has an enhanced hydrocarbon cracking activity as well as other hydroconversion reaction activities as noted for the catalyst of Example 1.

EXAMPLE 8

In this example a prior art hydrocracking catalyst is pulverized and a 90 gram portion is mixed with 10 grams of wheat flour and 65 grams of water followed by mixing, extruding and drying and calcining. The prior art catalyst, prior to use has the following weight percent composition:

| | |
|---|---|
| Nickel | 10 |
| Molybdenum | 12 |
| Phosphorous | 3 |
| Titanium | 7 |
| Silica | 13 |
| Alumina | 31 |
| Oxygen | Balance: | and characteristics:

| | |
|---|---|
| Bulk density, g/cc | 0.9 |
| Pore volume, cc/cc | 0.6 |
| Surface Area, $m^2/g$ | 270 |
| Average Pore Dia., Angstroms | 60 |

The resulting catalyst has a bulk density of 0.6 g/cc and approximately one-third of its pore volume is in macropores, i.e., access pores. In a pilot plant run of about 64 hours at 399° C it demonstrates excellent hydrocarbon hydroconversion activities.

EXAMPLE 9

In this example a prior art hydrodenitrification catalyst comprising nickel and tungsten disposed upon a titania modified silica-alumina base is pulverized and converted to a macroporous catalyst as in Example 1. Relative to the prior art catalyst, the resulting catalyst exhibits reduced diffusion limitation effects and at the same time a useful hydrodenitrification activity. It also exhibits improved attrition resistance relative to a similarly prepared catalyst wherein the steaming step is not used.

What is claimed is:

1. In a process for producing a rigidly interconnected pack of pulverable particles having average diameters in the range below about 1.3 mm and comprising aluminum oxide by steps, including (1) drying a dough-like mixture comprising said particles, water and an organic hydrocolloid-forming compound and (2) calcining said dried mixture, the improvement comprising, prior to said calcining, dry steaming said dough-like mixture and/or said dried mixture at a temperature in the range of from about 100° C to 175° C for a period in the range of from about 0.3 to 24 hours, wherein the resulting rigidly interconnected particle pack, relative to a comparable particle pack produced without said steaming, exhibits a substantially improved attrition resistance.

2. In a process for producing a catalyst comprising a carrier component and a catalytic component containing at least one hydrogenating agent by (1) wetting said carrier component with a solution of said agent or of a precursor thereof, and (2) drying the resulting wet carrier, said hydrogenating agent being selected from the group consisting of the metals, oxides, sulfides and chlorides of the metals of Groups V, VI, VII and VIII of the Periodic Chart of the Elements, the improvement wherein said carrier components is a pack of particles produced by the process of claim 1.

3. A process as in claim 2 wherein said catalyst is a hydrocarbon hydroconversion catalyst.

4. A process as in claim 2 wherein said particles contain at least 1 weight percent of aluminum oxide.

5. The composition resulting from the process of claim 4.

6. A process as in claim 1 wherein (1) said particles are calcined alumina powder, (2) said hydrocolloid-forming compound is a gum (3) said dough-like mixture is shaped by extruding and cutting the resulting extrudate, and (4) said shaped mixture is steamed for about 16 hours employing dry steam at a temperature of about 120° C and a pressure of about 2 atmospheres.

7. A process as in claim 4 wherein said particles are obtained by pulverizing an ordinary unused or used hydrocarbon conversion catalyst.

8. A process as in claim 4 wherein said pack is a mixture of at least two kinds of particles selected from the group consisting of particles comprising (1) aluminum oxide, (2) aluminum oxide and at least one of the oxides of the metals of Groups II, IV and of the other metals of Group III, and (3) particles of (1) or (2) containing at least one hydrogenating component selected from the metals, oxides, sulfides and chlorides of the metallic elements of Groups V, VI, VII and VIII.

9. The composition resulting from the process of claim 8.

10. A process as in claim 4 wherein said particles comprise a composite of a carrier component consisting essentially of alumina and an effective amount of at least one hydrogenation component selected from the group consisting of the metals, oxides, sulfides and chlorides of the metallic elements of Groups V, VI, VII and VIII.

11. The composition resulting from the process of claim 10.

* * * * *